United States Patent
Kim et al.

(10) Patent No.: US 9,148,782 B2
(45) Date of Patent: *Sep. 29, 2015

(54) METHOD FOR DETERMINING LOCATION OF UE BY USING AGPS INFORMATION

(75) Inventors: Wuk Kim, Gyeonggi-do (KR);
Joo-Young Kim, Gyeonggi-do (KR);
Joon-Goo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 761 days.

This patent is subject to a terminal disclaimer.

(21) Appl. No.: 13/407,263

(22) Filed: Feb. 28, 2012

(65) Prior Publication Data

US 2012/0157124 A1    Jun. 21, 2012

Related U.S. Application Data

(63) Continuation of application No. 11/228,125, filed on Sep. 16, 2005, now Pat. No. 8,150,415.

(30) Foreign Application Priority Data

Sep. 18, 2004    (KR) .................. 10-2004-0074883

(51) Int. Cl.
*H04W 24/00* (2009.01)
*H04W 12/02* (2009.01)
*G01S 5/00* (2006.01)
*G01S 19/05* (2010.01)
*G01S 19/25* (2010.01)
*H04L 29/06* (2006.01)
*H04W 4/02* (2009.01)

(52) U.S. Cl.
CPC ............ *H04W 12/02* (2013.01); *G01S 5/0036* (2013.01); *G01S 19/05* (2013.01); *G01S 19/25* (2013.01); *H04L 63/0407* (2013.01); *H04W 4/02* (2013.01)

(58) Field of Classification Search
CPC ................................ H04W 64/00; H04W 4/02
USPC .......... 455/456.1, 414.2, 456.3, 456.5, 456.2; 709/203

See application file for complete search history.

(56) References Cited

U.S. PATENT DOCUMENTS

| | | | |
|---|---|---|---|
| 8,150,415 B2 * | 4/2012 | Kim et al. .................. | 455/456.1 |
| 2004/0205198 A1 | 10/2004 | Zellner et al. | |
| 2005/0125493 A1 * | 6/2005 | Chaskar et al. ............... | 709/203 |
| 2006/0276167 A1 * | 12/2006 | Burroughs ................. | 455/404.2 |

* cited by examiner

*Primary Examiner* — Justin Lee
(74) *Attorney, Agent, or Firm* — The Farrell Law Firm, P.C.

(57) ABSTRACT

A method and apparatus are disclosed for providing location information of a User Equipment (UE) in a communication system including the UE, a Secure User Plane Location (SUPL) Location Center (SLC), and a SUPL Positioning Center (SPC). The method includes receiving, by the SLC, a request for the location information of the UE from a requester; notifying, by the SLC, the UE that the location information has been requested; transmitting, by the SLC to the SPC, a pseudo IDentifier (ID) for securing a connection between the SPC and the SLC; receiving, by the SLC from the SPC, the location information of the UE with the pseudo ID, the location information of the UE being calculated by the SPC, based on a positioning measurement measured by the UE; and transmitting, by the SLC, the location information to the requester.

24 Claims, 6 Drawing Sheets

METHOD FOR DETERMINING LOCATION OF UE BY USING AGPS INFORMATION

PRIORITY

This application is a Continuation of U.S. application Ser. No. 11/228,125, which was filed in the U.S. Patent and Trademark Office on Sep. 16, 2005, and claims priority to Korean Application Serial No. 2004-74883, which was filed in the Korean Intellectual Property Office on Sep. 18, 2004 and assigned, the content of each of which is incorporated herein by reference.

BACKGROUND OF THE INVENTION

1. Field of the Invention

The present invention relates to a UE location determination system for determining the location of a User Equipment (UE), and more particularly to a method for determining the location of a UE by means of Assisted Global Positioning System (AGPS) information.

2. Description of the Related Art

With the development of communication technology and the global spread of mobile communication networks, UE users want to receive not only a communication service but also various supplementary services using location information. Generally, because UEs may be carried by users and may perform communication wirelessly, communication carriers may provide UE users with various supplementary services by means of location information. Recent supplementary services using UE location information, which have been widely provided by communication carriers, include traffic information services, map download services, location information services, weather information services, emergency services, car navigation services, etc. These various supplementary services provided based on the location information of UEs will be referred to as location services. In order to receive these location services, the location of a UE must be exactly determined. Typically, a UE receives location assistance information, that is, AGPS information, receives exact GPS signals from GPS satellites, and then determines its own location by means of the GPS signals. The UE receives the AGPS information through a control plane such as an Radio Resource Control (RRC) of a Wideband Code Division Multiple Access (WCDMA) system, an Radio Resource Location Protocol (RRLP) of a General Packet Radio Service (GPRS) system and a control plane according to an IS-801 standard of a CDMA system, and determines its own location. Otherwise, the UE receives the AGPS information through a Secure User Plane Location (SUPL) using an Internet Protocol (IP)-based network, and determines its own location. FIG. 1 shows a UE location determination system for determining the location of a UE after receiving the AGPS information through the SUPL using the IP-based network.

FIG. 1 is a block diagram schematically showing the conventional construction of the UE location determination system using the AGPS information. Referring to FIG. 1, the UE location determination system includes a UE 10 and a SUPL Location Platform (SLP) 20. The UE 10, an object of location measurement, measures exact GPS signals using the AGPS information and transfers the measured GPS signals to the SLP 20.

The SLP 20 generates the AGPS information, transfers the AGPS information to the UE 10, computes the location of the UE 10 by means of values of the GPS signals measured by the UE 10, and determines the location of the UE 10 according to the computation result. This SLP 20 may include two parts, that is, an SUPL Location Center (SLC) 22 and an SUPL Positioning Center (SPC) 24. When location information is requested, the SLC 22 authenticates a requester having requested the location information, manages location information of UEs, performs an interface between the UE 10 and the SPC 24, and provides the location information requester with the final computed location of the UE 10. The SPC 24 generates the AGPS information for the UE 10 (object of location measurement), computes the location of the UE 10 after receiving the GPS information measured by the UE 10 through the SLC 22, and transfers location information for the computed location to the SLC 22. As a result, the location information is provided to the location information requester.

In the conventional location determination system as described above, an identifier (ID) of the same UE is used among the UE 10 and the SLC 22 and the SPC 24. For example, when a location request for a UE having a specific ID is received, the SLC 22 requests AGPS information for the UE by means of the UE ID. Also, the SPC 24 generates the AGPS information and transfers the AGPS information by means of the UE ID. That is, the UE ID is used between the SLC 22 and the SPC 24, so that transfer of the location information is accomplished.

When the location information is transferred through use of the UE ID between the SLC 22 and the SPC 24, messages exchanged between the SLC 22 and the SPC 24 may be leaked. Therefore, the location information for the location of the UE may be easily exposed because the UE ID is not secure. That is, in the conventional location determination system using the SUPL, the transfer of the location information between the SLC 22 and the SPC 24 through the use of the UE ID is not secure. As a result, a UE user's privacy may be compromised.

SUMMARY OF THE INVENTION

Accordingly, the present invention has been made to solve the above-mentioned problems occurring in the prior art, and to provide at least the advantages described below.

An aspect of the present invention to provide a method for determining the location of a UE by means of AGPS information, which defines a new interface between an SLC and an SPC and transfers location information, thereby improving security and preventing a UE user's privacy from being compromised.

It is another aspect of the present invention to provide a method for determining the location of a UE by means of AGPS information, which transfers location information by using a pseudo UE ID instead of a UE ID in transferring the location information between an SLC and an SPC, thereby protecting the anonymity and the location information of the UE.

In accordance with an aspect of the present invention, a method is described for providing location information of a User Equipment (UE) in a communication system including the UE, a Secure User Plane Location (SUPL) Location Center (SLC), and a SUPL Positioning Center (SPC). The method includes receiving, by the SLC, a request for the location information of the UE from a requester; notifying, by the SLC, the UE that the location information has been requested; transmitting, by the SLC to the SPC, a pseudo IDentifier (ID) for securing a connection between the SPC and the SLC; receiving, by the SLC from the SPC, the location information of the UE with the pseudo ID, the location information of the UE being calculated by the SPC, based on a positioning measurement measured by the UE; and transmitting, by the SLC, the location information to the requester In accordance with another aspect of the present invention, a Secure User Plane Location (SUPL) Location Center (SLC) is described for providing location information of a User Equipment (UE) in a communication system including the UE, the SLC, and a SUPL Positioning Center (SPC). The SLC includes a processor that receives a request for the location information of the UE from a requester, notifies the UE that the location information has been requested, transmits a pseudo IDentifier (ID) to the SPC, receives, from the SPC, the location information of the UE with the pseudo IDentifier (ID), and transmits the location information to the requester; and a pseudo ID generator that generates the pseudo ID for securing a connection between the SPC and the SLC.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail herein below with reference to the accompanying drawings. In the following description, a detailed description of known functions and configurations incorporated herein will be omitted when it may obscure the subject matter of the present invention.

Figure 1:
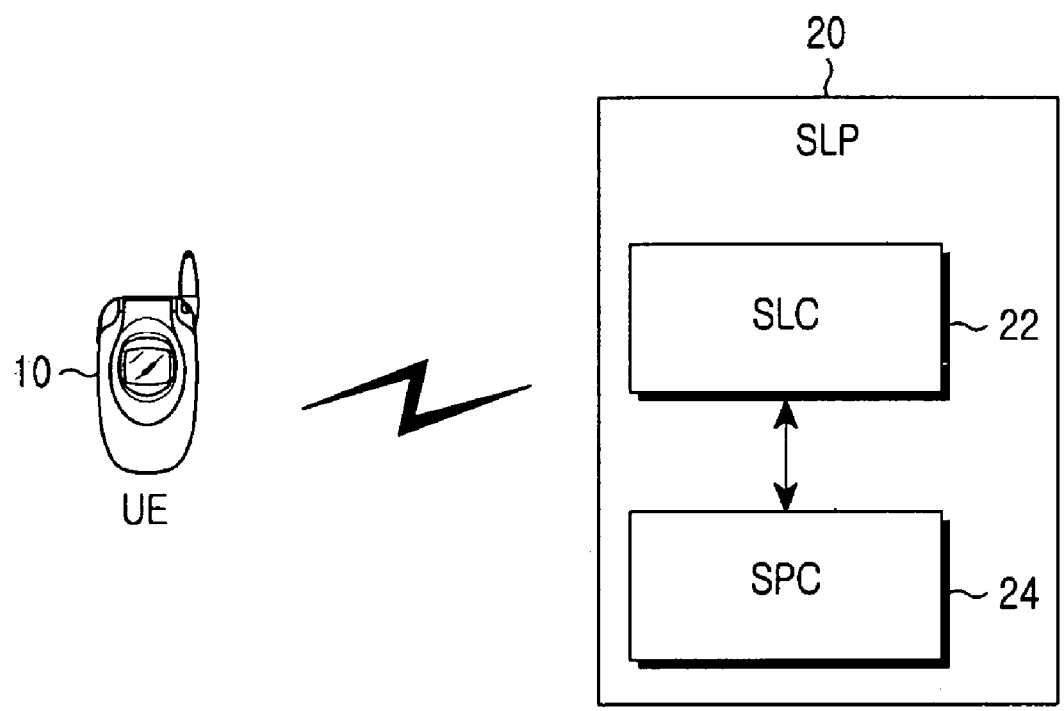
FIG. 1 is a block diagram schematically showing a conventional construction of a UE location determination system using AGPS information.
Figure 2A:
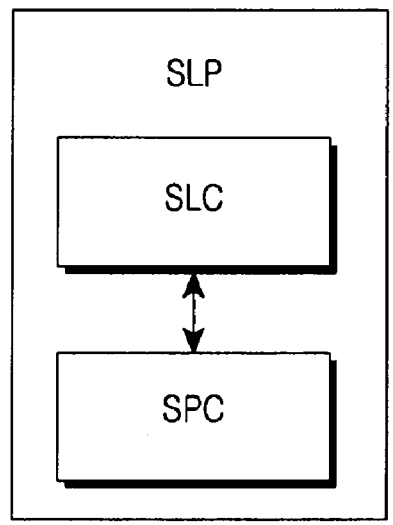
FIGS. 2A and 2B are block diagrams of a UE location determination system using AGPS information according to an embodiment of the present invention.
Figure 2B:
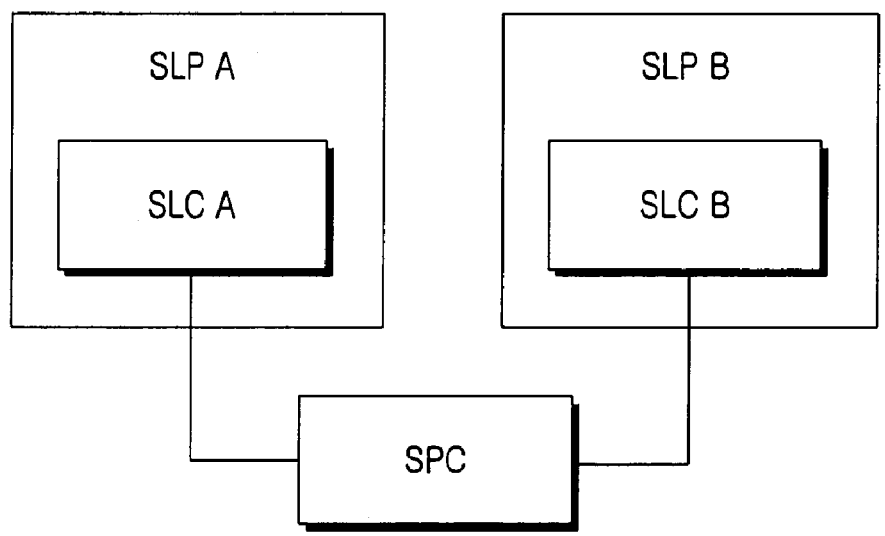

FIGS. 2A and 2B are block diagrams of a User Equipment (UE) location determination system using Assisted Global Positioning System (AGPS) information according to an embodiment of the present invention. Referring to FIG. 2, an SUPL Location Center (SLC) and an SUPL Positioning Center (SPC) of the UE location determination system according to the embodiment of the present invention may be integrated with each other as illustrated in FIG. 2A. Otherwise, the SLC and the SPC may be separately constructed as illustrated in FIG. 2B. When the SLC is integrated with the SPC as illustrated in FIG. 2A and the SPC communicates with one SLC, it may be possible not to use identification information for identifying the SLC between the SLC and the SPC. However, when the SLC and the SPC are separately constructed as illustrated in FIG. 2B and the SPC communicates with multiple SLCs, i.e., an SLC A and an SLC B, it is required to provide identification information for identifying each SLC among the SLCs A and B and the SPC.

Figure 3:
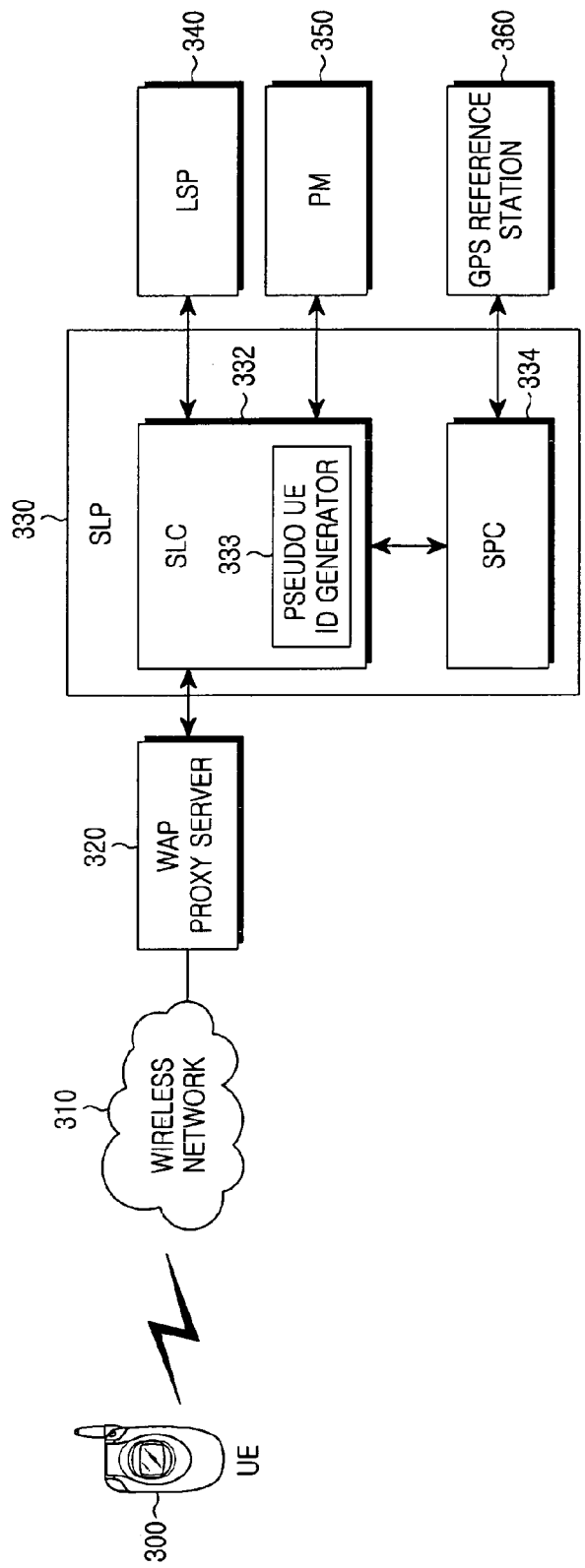
FIG. 3 is a block diagram illustrating a UE location determination system using AGPS information according to a first embodiment of the present invention.

Hereinafter, a case where the SLC is integrated with the SPC according to a first embodiment of the present invention will be described with reference to FIG. 3, which is a block diagram of a UE location determination system using AGPS information. Referring to FIG. 3, the UE location determination system includes a UE 300, a Wireless Application Protocol (WAP) proxy server 320, an SUPL Location Platform (SLP) 330, a Location Service Provider (LSP) 340, a Privacy Management (PM) module 350, and a GPS reference station 360.

The UE 300, which is an object of location measurement, measures exact GPS signals by means of the AGPS information and transfers the measured GPS signals to the SLP in order to allow a location of the UE 300 to be computed. Otherwise, the UE 300 directly computes its own location by means of the measured GPS signals. The UE 300 may be connected to the SLP 330 after accessing the WAP proxy server 320 connected to a wireless network 310 by means of a WAP. The WAP proxy server 320 performs a message transfer between the UE 300 and the SLP 330.

The SLP 330 generates the AGPS information to transfer the generated AGPS information to the UE 300, computes the location of the UE 300 by means of GPS signal values measured by the UE 300, and determines the location of the UE 300 based on a result obtained by the computation. The SLP 330 is logically divided into an SLC 332 and an SPC 334. However, the SLC 332 and the SPC 334 are physically integrated with each other.

The SLC 332 performs an authentication for a location information requester (e.g., a mobile equipment, a location service provider, etc.) having requested location information for the UE 300 when the location information for the UE 300 is requested, manages the location information, performs an interface between the UE 300 and the SPC 334, and provides the location information requester with final computed location information for the UE 300. Further, the SLC 332 includes a generator 333 for generating a pseudo UE ID corresponding to a UE ID. That is, when communicating with the SPC 334, the SLC 332 generates the pseudo UE ID corresponding to the UE ID in order to protect the UE ID, and uses the generated pseudo UE ID. The pseudo UE ID may be a sequence number predetermined between the SLC 332 and the SPC 334. Accordingly, the SLC 332 assigns a sequence number according to an order of UEs location information of which has been requested, and distinguishes the UEs by means of the sequence number instead of the UE ID in communication with the SPC 334.

The SPC 334 distinguishes the UEs by means of the SLC 332 and the sequence number, receives an AGPS request message to generate AGPS information for a UE, which is an object of location measurement, and receives GPS information measured by the UE 300 to compute the location of the UE 300. The SPC 334 transfers the computed location information to the SLC 332 and allows the location information to be provided to the location information requester (e.g., the mobile equipment or the location service provider).

The LSP 340 receives the location of the UE 300 from the SLC 332 and provides a location service such as a map service, a traffic service, and an emergency rescue service. The PM 350 performs a protection service for location information of a UE user and the GPS reference station 360 provides GPS satellite information.

Figure 4:
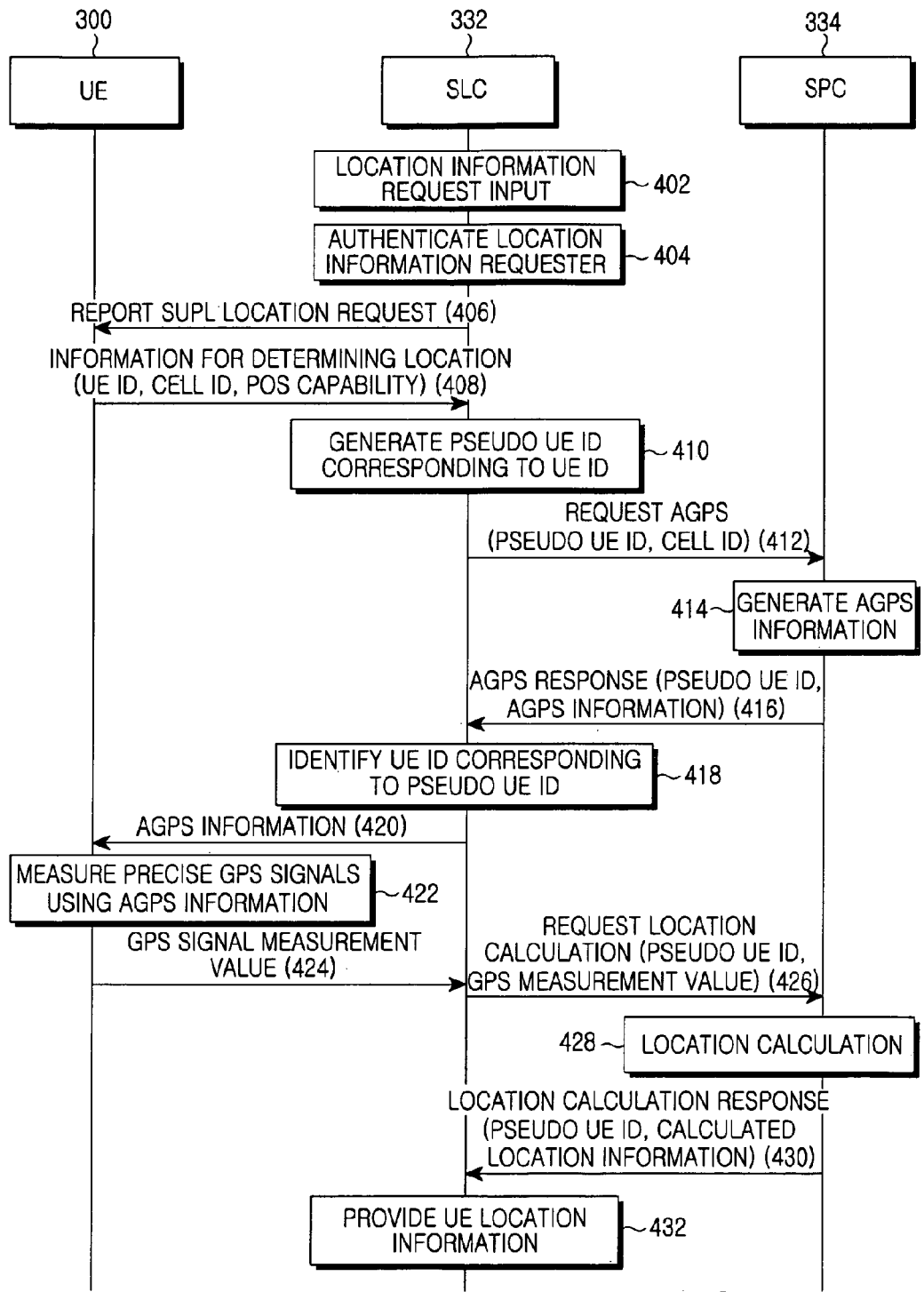
FIG. 4 is a flow diagram illustrating a UE location determination method using AGPS information according to a first embodiment of the present invention.

FIG. 4 is a flow diagram illustrating a UE location determination method using AGPS information according to the first embodiment of the present invention. Referring to FIG. 4, in step 402, the SLC 332 receives a request for location information of the UE 300 from the UE 300 or the LSP 340.

In step 404, the SLC 332 authenticates the location information requester, i.e., the UE 300 or the LSP 340. In step 406, the SLC 332 informs the UE 300, which is an object of the location information request, of an SUPL location request. Herein, the SLC 332 may inform the UE 300 of the SUPL location request by means of a WAP push or a Short Message Service (SMS). In step 408, the UE 300 provides the SLC 332 with information used for determining the location of the UE 300. The information includes the ID of the UE 300, the ID of a cell in which the UE 300 is located, and a positioning method capability of the UE 300.

After receiving the information, the SLC 332 generates a pseudo UE ID corresponding to a UE ID in order to substitute for the UE ID included in the received information in step 410. The pseudo UE ID is an interface predetermined between the SLC 332 and the SPC 334, which may be a sequence number representing an order of UEs location information of which has been requested. That is, the SLC 332 assigns a sequence number according to the order of the UEs the location information of which has been requested, and distinguishes the UEs by means of the sequence number instead of the UE ID in communication with the SPC 334.

After generating the pseudo UE ID, e.g., the sequence number, as described above, the SLC 332 requests AGPS information of the UE 300, the location information of which has been requested, to the SPC 334 by means of the sequence number in step 412. A message for requesting the AGPS information includes the pseudo UE ID (the sequence number) and the ID of the cell in which the UE 300 is located.

After the SPC 334 receives the AGPS request message including the pseudo UE ID (the sequence number) and the ID of the cell in which the UE 300 is located, the SPC 334 generates the AGPS information by means of a coarse location of the UE 300, e.g., the location of the cell in which the UE 300 is located and GPS satellite information from the GPS reference station 360, in step 414. The AGPS information is assisted GPS information provided for a precise measurement of the GPS information. After generating the AGPS information, the SPC 334 transmits an AGPS response message to the SLC 332 by means of the pseudo UE ID in step 416. That is, the SPC 334 transmits the AGPS response message including the pseudo UE ID (the sequence number) and the AGPS information to the SLC 332.

In step 418, the SLC 332 receives the pseudo UE ID (sequence number) and the AGPS information, identifies an actual UE ID corresponding to the pseudo UE ID, i.e., the sequence number, and determines the UE to which the AGPS information belongs. In step 420, the SLC 332 transmits the AGPS information to the corresponding UE 300. In step 422, the UE 300 measures precise GPS signals by means of the AGPS information. In step 424, the UE 300 transmits GPS measurement values for the GPS signals to the SLC 332.

Then, after the SLC 332 receives the GPS measurement values from the UE 300 in step 426, the SLC 332 requests a location calculation for the GPS measurement values to the SPC 334. Herein, a location calculation request message transferred from the SLC 332 to the SPC 334 includes the pseudo UE ID (sequence number) and the GPS measurement values.

Then, after the SPC 334 receives the location calculation request message from the SLC 332 in step 428, the SPC 334 calculates the location of the UE 300 by means of the GPS measurement values included in the location calculation request message. In step 430, the SPC 334 transmits a location calculation response message to the SLC 332. The location calculation response message includes the pseudo UE ID and information for the calculated location. Then, when the SLC 332 receives the location calculation response message from the SPC 334 in step 432, the SLC 332 provides the UE location information requester with the information for the location of the UE 300. In the above description, the SPC 334 performs the calculation for the location of the UE 300. However, the UE 300 can directly perform the calculation for the location of the UE 300. That is, when the UE 300 directly calculates its own location, the UE 300 does not provide the GPS measurement values to the SPC 334. Instead, the UE 300 directly calculates its own location by means of the GPS measurement values and transmits the information for the calculated location to the SLC 332.

As described above, in the UE location determination method using the AGPS information according to the first embodiment of the present invention, the anonymity and the location information of the UE are protected by using the pseudo UE ID instead of the actual UE ID when the SLC 332 is communicating with the SPC 334.

Figure 5:
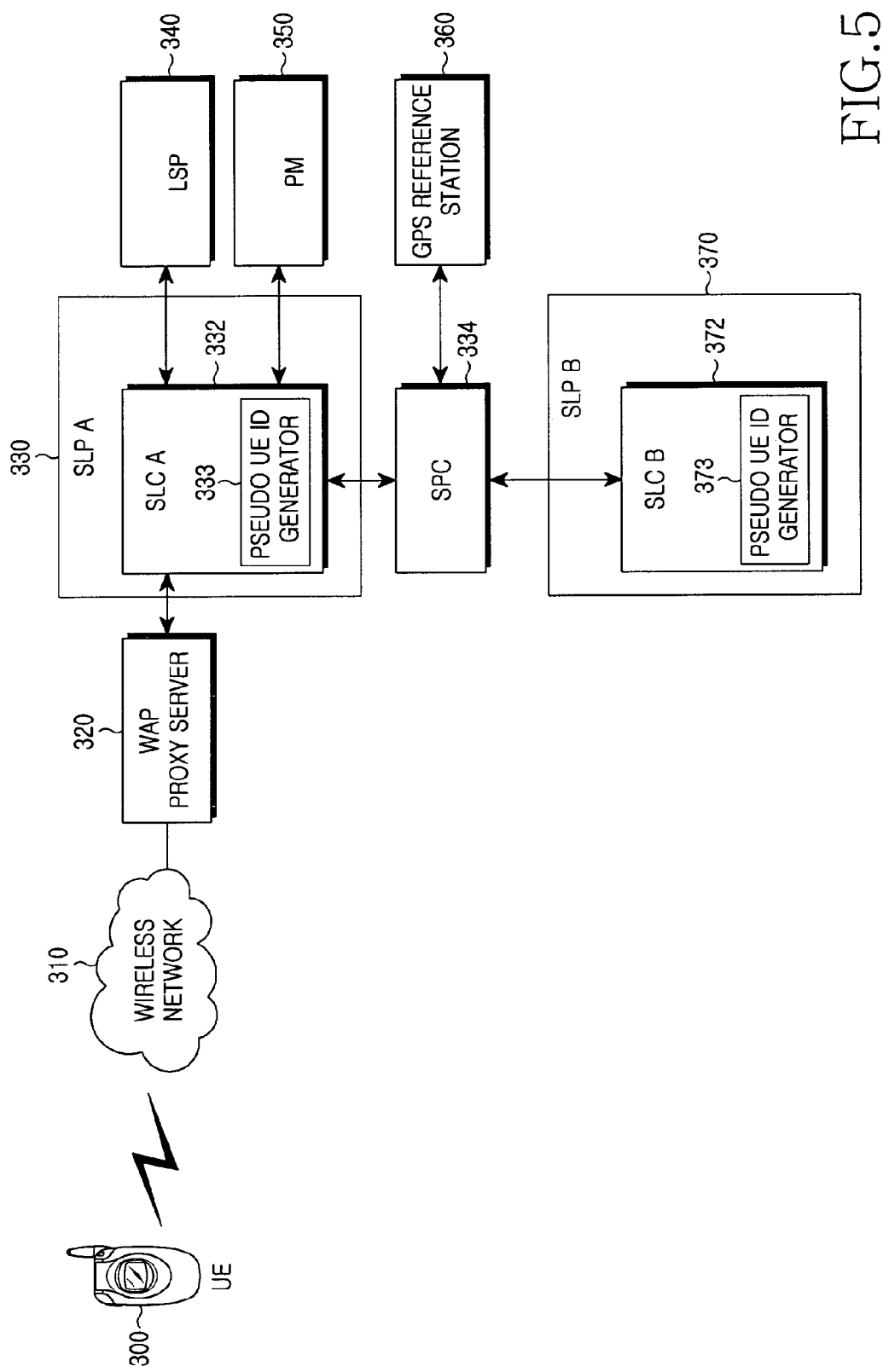
FIG. 5 is a block diagram illustrating a UE location determination system using AGPS information according to a second embodiment of the present invention.

Hereinafter, a case where the SLC is physically separated from the SPC according to a second embodiment of the present invention will be described. When the SLC is physically separated from the SPC according to the second embodiment of the present invention, the SLC can communicate with a plurality of SPCs. Accordingly, when the SLC communicates with the SPC, the SLC must inform the SPC of its own identification information. FIG. 5 is a block diagram of a UE location determination system using AGPS information according to the second embodiment of the present invention. Referring to FIG. 5, because a SPC 334 must communicate with two SLCs 332 and 372, each of the two SLCs 332 and 372 must inform the SPC 334 of its own identification information (SLC ID) and its own address (SLC address) when communicating with the SPC 334.

Figure 6:
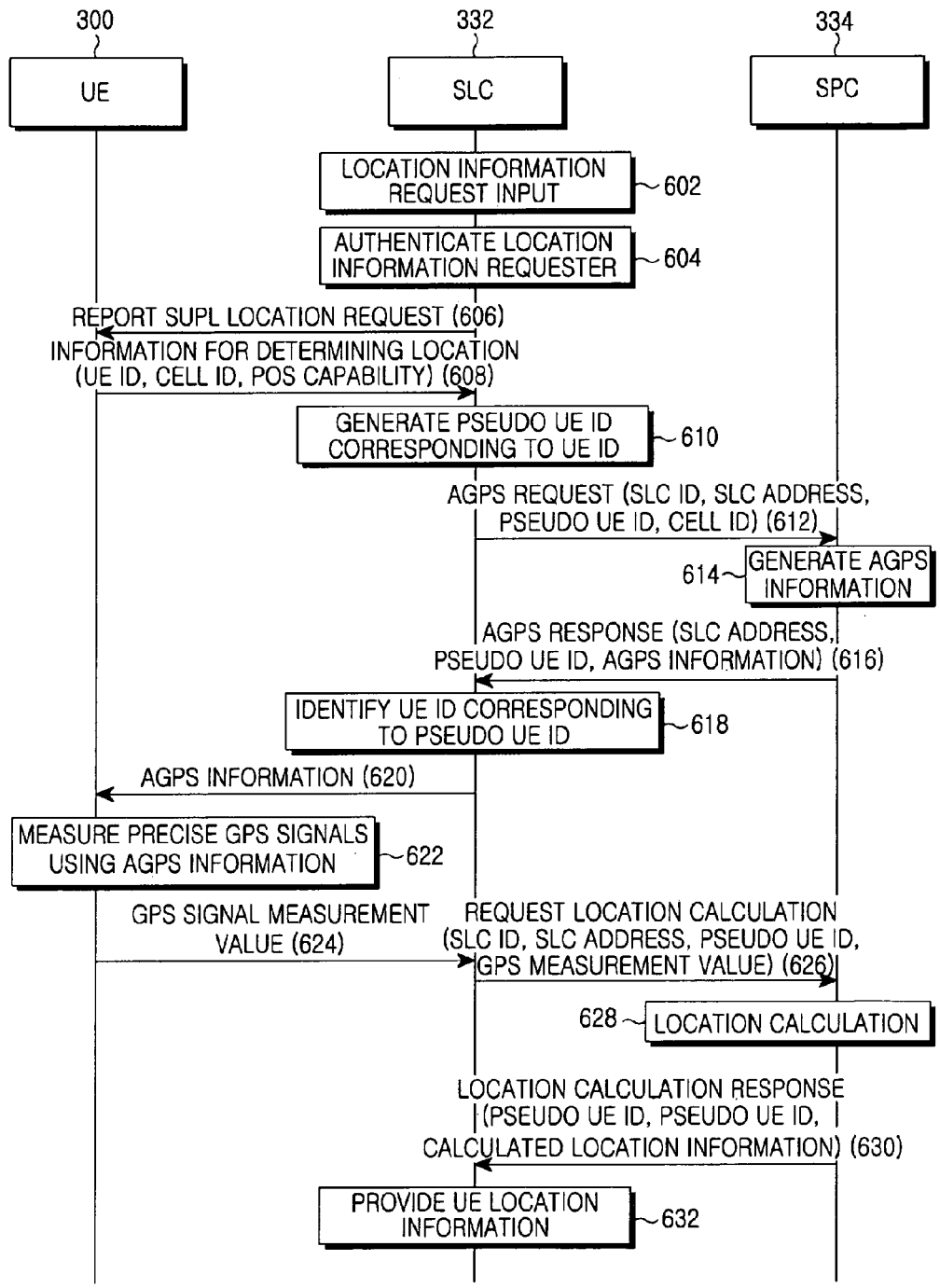
FIG. 6 is a flow diagram illustrating a UE location determination method using AGPS information according to a second embodiment of the present invention.

A method for determining the location of a UE in the UE location determination system according to the second embodiment of the present invention will be described in detail with reference to FIG. 6. FIG. 6 is a flow diagram illustrating a UE location determination method using AGPS information according to the second embodiment of the present invention. Referring to FIG. 6, because operations of steps 602, 604, 606, 608 and 610 are the same as those of steps 402, 404, 406, 408 and 410 as described in FIG. 4, a description of steps 602, 604, 606, 608 and 610 will be omitted and operations after step 612 will be described. In step 612, the SLC 332 transmits an AGPS information request message to the SPC 334. The AGPS information request message includes an SLC ID, an SLC address, a pseudo UE ID and a cell ID. When the SPC 334 receives the AGPS information request message in step 614, the SPC 334 generates AGPS information by means of the coarse location of the UE 300, i.e., the location of a cell including the UE 300 and GPS satellite information from the GPS reference station 360. The AGPS information is assisted GPS information provided for a precise measurement of GPS information. After generating the AGPS information, the SPC 334 transmits an AGPS response message to the SLC 332, which has requested the AGPS information, by means of the SLC ID received in step 612, in step 616. The AGPS response message includes the SLC address, the pseudo UE ID and the AGPS information.

When the SLC 332 receives the AGPS response message in step 618, the SLC 332 identifies an actual UE ID corresponding to the pseudo UE ID, i.e., the sequence number, and determines the UE to which the AGPS information belongs. In step 620, the SLC 332 transmits the AGPS information to the corresponding UE 300. In step 622, the UE 300 measures precise GPS signals by means of the AGPS information. In step 624, the UE 300 transmits GPS measurement values for the GPS signals to the SLC 332.

After the SLC 332 receives the GPS measurement values from the UE 300 in step 626, the SLC 332 requests a location calculation for the GPS measurement values to the SPC 334. Herein, a location calculation request message transferred from the SLC 332 to the SPC 334 includes the SLC ID for identifying SLCs, the SLC address, the pseudo UE ID and the GPS measurement values. When the SPC 334 receives the location calculation request message from the SLC 332 in step 628, the SPC 334 calculates the location of the UE 300 by means of the GPS measurement values included in the location calculation request message. In step 630, the SPC 334 transmits a location calculation response message to the SLC 332 corresponding to the SLC ID included in the location calculation request message. The location calculation response message includes the SLC address, the pseudo UE ID and information for the calculated location. After the SLC 332 receives the location calculation response message from the SPC 334 in step 632, the SLC 332 provides the UE location information requester with the information for the location of the UE 300.

In the second embodiment of the present invention as described above, the location of the UE 300 is calculated by the SPC 334. However, the UE 300 can directly calculate the location of the UE 300. That is, when the UE 300 directly calculates its own location, the UE 300 does not provide the GPS measurement values to the SPC 334. Instead, the UE 300 directly calculates its own location by means of the GPS measurement values and transmits the information for the calculated location to the SLC 332.

In the method for determining the location of the UE according to the second embodiment of the present invention as described above, when the SLC 332 is communicating with the SPC 334, the SLC 332 informs the SPC 334 of its own identification information, i.e., the SLC ID, and uses the pseudo UE ID. Accordingly, the anonymity and the location information of the UE can be protected even when the SPC communicates with the multiple the SLCs, i.e., SLCs 332 and 372.

According to the present invention as described above, a pseudo UE ID is used instead of an actual UE ID when a SLC communicates with a SPC, so that the anonymity and the location information of a UE can be protected.

Further, the present invention enhances security and reduces the risk of compromising a UE user's privacy as compared with a case where location information is transferred between a SLC and a SPC by means of an ID of a UE.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of providing location information of a User Equipment (UE) in a communication system including a Secure User Plane Location (SUPL) Location Center (SLC), and a SUPL Positioning Center (SPC), the method comprising:
    receiving, by the SLC, a request for the location information of the UE from a requester;
    transmitting, by the SLC to the SPC, a request message including an SLC IDentifier (ID) and a location ID;
    receiving, by the SLC from the SPC, a response message including the location information of the UE, the location information being calculated by the SPC, based on a positioning measurement measured by the UE; and
    transmitting, by the SLC, the location information to the requester.

2. The method of claim 1, wherein the request message further includes a pseudo ID for securing a connection between the SPC and the SLC.

3. The method of claim 1, further comprising receiving, by the SLC from the UE, information including at least one of an ID of UE, the location ID, and information about a positioning capability of the UE.

4. The method of claim 3, wherein the location ID includes an ID of a cell in which the UE is located.

5. The method of claim 2, further comprising:
    receiving, by the SLC from the SPC, information for positioning with the pseudo ID;
    transmitting, by the SLC to the UE, the information for positioning with a UE ID;
    receiving, by the SLC, positioning measurement information measured by the UE with the UE ID; and
    transmitting, by the SLC to the SPC, the positioning measurement information measured by the UE with the pseudo ID.

6. The method of claim 5, wherein the positioning measurement information includes Global Positioning System (GPS) information.

7. The method of claim 5, further comprising identifying, by the SLC, the UE ID corresponding to the pseudo UE ID, when the information for positioning is received.

8. The method of claim 7, wherein the UE corresponds to the identified UE ID.

9. The method of claim 1, wherein the request message further includes information about a positioning capability of the UE.

10. The method of claim 1, wherein the request includes a first session ID including an ID of UE and the request message further includes a second session ID including the SLC ID, and
    wherein the second session ID is different from the first session ID.

11. A Secure User Plane Location (SUPL) Location Center (SLC) for providing location information of a User Equipment (UE) in a communication system including the SLC, and a SUPL Positioning Center (SPC), the SLC comprising:
    a transceiver that receives a request for the location information of the UE from a requester; and
    a processor that generates a request message including an SLC IDentifier (ID) and a location ID,
    wherein the transceiver transmits the request message to the SPC, receives a response message including the location information of the UE from the SPC, and transmits the location information to the requester, and
    wherein the location information of the UE is calculated by the SPC, based on a positioning measurement measured by the UE.

12. The SLC of claim 11, wherein the processor receives, from the UE, information including at least one of an ID of the UE, the location ID, and information about a positioning capability of the UE.

13. The SLC of claim 12, wherein the location ID includes an ID of a cell in which the UE is located.

14. The SLC of claim 11, wherein the processor receives, from the SPC, information for positioning with the pseudo ID, transmits the information for positioning with a UE ID to the UE, receives positioning measurement information measured by the UE with the UE ID, and transmits, to the SPC, the positioning measurement information measured by the UE with the pseudo ID.

15. The SLC of claim 14, wherein the positioning measurement information includes Global Positioning System (GPS) information.

16. The SLC of claim 14, wherein the processor identifies the UE ID corresponding to the pseudo UE ID, when the information for positioning is received, and
wherein the UE corresponds to the identified UE ID.

17. The SLC of claim 11, wherein the request message further includes a pseudo ID for securing a connection between the SPC and the SLC.

18. The SLC of claim 11, wherein the request includes a first session ID including an ID of UE and the request message further includes a second session ID including the SLC ID, and wherein the second session ID is different from the first session ID.

19. A method of providing location information of a User Equipment (UE) or another UE in a communication system including a Secure User Plane Location (SUPL) Location Center (SLC) and a SUPL Positioning Center (SPC), the method comprising:
transmitting, by the UE, a request for the location information of the UE or the another UE; and
receiving, by the UE from the SLC, the location information,
wherein the location information is calculated by the SPC, based on a positioning measurement measured by the UE and received from the SPC through the SLC, in response to a request message including an SLC IDentifier (ID) and a location ID from the SLC to SPC.

20. The method of claim 19, wherein the request message further includes information including at least one of an ID of the UE, the location ID, and information about a positioning capability of the UE.

21. The method of claim 19, wherein the request includes a first session ID including an ID of the UE,
wherein the request message further includes a second session ID including the SLC ID, and
wherein the second session ID is different from the first session ID.

22. A User Equipment (UE) for receiving location information of a User Equipment (UE) or another UE in a communication system including, a Secure User Plane Location (SUPL) Location Center (SLC) and a SUPL Positioning Center (SPC),
a processor that generates a request for the location information of the UE or the another UE; and
a transceiver that transmits the request to the SLC and receives the location information from the SLC,
wherein the location information is calculated by the SPC, based on a positioning measurement measured by the UE and received from the SPC through the SLC, in response to a request message including a SLC IDentifier (ID) and a location ID from the SLC to SPC.

23. The UE of claim 22, wherein the request message further includes information including at least one of an ID of UE, the location ID, and information about a positioning capability of the UE.

24. The UE of claim 22, wherein the request includes a first session ID including an ID of the UE,
wherein the request message further includes a second session ID including the SLC ID, and
wherein the second session ID is different from the first session ID.

\* \* \* \* \*